(12) United States Patent
Zerbe

(10) Patent No.: US 8,305,871 B2
(45) Date of Patent: Nov. 6, 2012

(54) CROSSTALK MINIMIZATION IN SERIAL LINK SYSTEMS

(75) Inventor: Jared L. Zerbe, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 261 days.

(21) Appl. No.: 12/344,086

(22) Filed: Dec. 24, 2008

(65) Prior Publication Data

US 2009/0103572 A1    Apr. 23, 2009

Related U.S. Application Data

(60) Continuation of application No. 10/849,692, filed on May 19, 2004, now abandoned, and a division of application No. PCT/US2005/016891, filed on May 13, 2005.

(51) Int. Cl.
*H04J 1/12* (2006.01)
(52) U.S. Cl. ............... 370/201; 326/16; 326/21; 326/26
(58) Field of Classification Search .................. 370/201, 370/503, 506, 508, 516, 518, 517, 519; 326/16, 326/21, 26
See application file for complete search history.

(56) References Cited

U.S. PATENT DOCUMENTS

| | | | | |
|---|---|---|---|---|
| 5,509,038 | A | 4/1996 | Wicki | 375/371 |
| 5,598,406 | A | 1/1997 | Albrecht et al. | 370/296 |
| 5,887,032 | A | 3/1999 | Cioffi | 375/257 |
| 6,085,284 | A * | 7/2000 | Farmwald et al. | 711/105 |
| 6,321,282 | B1 | 11/2001 | Horowitz | 710/104 |
| 6,366,991 | B1 | 4/2002 | Manning | 711/167 |
| 6,646,953 | B1 | 11/2003 | Stark | 365/233 |
| 6,788,098 | B1 * | 9/2004 | Alani et al. | 326/16 |
| 2003/0053489 | A1 | 3/2003 | Zerbe | 370/503 |
| 2004/0037569 | A1 | 2/2004 | Kamalov | 398/162 |
| 2005/0163207 | A1 * | 7/2005 | Buckwalter et al. | 375/229 |

FOREIGN PATENT DOCUMENTS

| | | |
|---|---|---|
| EP | 0886407 | 12/1998 |
| EP | 1424871 | 6/2004 |
| WO | 0065791 | 11/2000 |

OTHER PUBLICATIONS

Stojanovic, Vladimir et al., "Adaptive Equalization and Data Recovery in a Dual-Mode (PAM2/4) Serial Link Transceiver." Rambus, Inc. Department of Electrical Engineering, Stanford University, Jan. 2004. 4 pages.

(Continued)

*Primary Examiner* — Kibrom T Hailu
*Assistant Examiner* — Dady Chery
(74) *Attorney, Agent, or Firm* — Silicon Edge Law Group LLP; Arthur J. Behiel

(57) ABSTRACT

Described are methods and circuits for reducing the error-inducing effects of crosstalk. Communication circuits in accordance with some embodiments adjust the phase of transmitted "aggressor" data to misalign transmitted signals from the perspective of "victim" channels. This misalignment moves the noise artifacts cross coupled to the victim channel away from sensitive sample times in the victim data, and consequently reduces the net effects of aggressor crosstalk on neighboring victim channels. Some embodiments reduce the effects of crosstalk by introducing static timing offsets to one or a plurality of aggressor transmitters, one or a plurality of victim transmitters, or some combination of aggressor and victim transmitters. Other embodiments dynamically alter the relative timing of aggressor and victim transmitters.

19 Claims, 7 Drawing Sheets

OTHER PUBLICATIONS

Sidiropoulos et al., "Adaptive Bandwidth DLLs and PLLs using Regulated Supply CMOS Buffers", 2000 Symposium on VLSI Circuits Digest of Technical Papers, 2000 IEEE.

Johnson, Howard Dr., "Mitigating Crosstalk." High-Speed Digital Design-online Newsletter—vol. 6, Issue 01. Jan. 20, 2003. pp. 1-3.

Stojanovic et al., "Modeling and Analysis of High-Speed Links". Research supported by the MARCO Interconnect Focus Center and Rambus, Inc.; Sep. 21, 2003. 8 pages.

Sidiropoulos, S., et al. "A Semidigital Dual Delay-Locked Loop", IEEE Journal of Solid-State Circuits, vol. 32, No. 11, pp. 1683-1692, (Nov. 1997).

* cited by examiner

CROSSTALK MINIMIZATION IN SERIAL LINK SYSTEMS

FIELD OF THE INVENTION

The present invention relates generally to the field of communications, and more particularly to noise abatement for high speed electronic signaling within and between integrated circuit devices.

BACKGROUND

FIG. 1 (prior art) depicts a conventional backplane communication system 100. Communication system 100 includes a pair of line cards 105 connected to a backplane 115 via a respective pair of backplane connectors 120. Each of line cards 105 supports a corresponding integrated circuit 125 mounted within a package 135. Integrated circuits 125 communicate via communication channels, or "links," made up of line-card traces 145, connectors 120, and backplane traces 150 as well as other sub-components such as inter-layer vias, etc.

Integrated circuits 125 communicate internally at very high speeds, tens of gigabits per second in some examples. The communication channels extending between integrated circuits 125 are comparatively slow, and consequently limit system speed performance. A considerable effort has been made to address this performance limitation.

System 100 of FIG. 1 is simplified for ease of illustration; in a practical system, backplane 115 and line cards 105 include a complex matrix of densely populated communication channels. As a result, data transmitted on some of the communication channels electromagnetically couples into adjacent or nearby communication channels, resulting in a type of noise conventionally termed "crosstalk." The combined crosstalk from numerous "aggressor" channels induces data errors on one or more neighboring "victim" channels. Addressing this problem is critical to improving system speed performance while maintaining acceptable bit-error-rates "BER". As used herein, the term aggressor channel is intended to describe the channel carrying a signal that causes a crosstalk effect in another channel, and the term victim channel is intended to describe a channel carrying a signal that experiences the effect of such crosstalk. A channel may at one time be both an aggressor channel relative to one channel and a victim channel relative to another channel. A channel may at some times be an aggressor channel and at other times a victim channel.

BRIEF DESCRIPTION OF THE FIGURES

The present invention is illustrated by way of example, and not by way of limitation, in the figures of the accompanying drawings and in which like reference numerals refer to similar elements.

DETAILED DESCRIPTION

Various embodiments of the present invention may be employed to reduce the impact of crosstalk. Communication circuits in accordance with some embodiments adjust the timing of transitions of transmitted "aggressor" data to reduce, from the perspective of potential victim receivers, the effects of crosstalk. This adjustment of the transition timing moves the noise artifacts on the coupled victim channel away from sensitive regions in the victim data, and consequently reduces the effects of crosstalk on the victim data.

Some embodiments reduce the effects of crosstalk by introducing static timing offsets to one or a plurality of aggressor transmitters, one or a plurality of victim transmitters, or some combination of aggressor and victim transmitters. Other embodiments dynamically alter the relative timing of aggressor and victim transmitters.

Some high-performance communication systems employ receivers that capture data and the associated timing from the incoming data stream. Because such receivers recover the timing from the incoming signal, the receivers do not need a reference clock signal having a phase that is fixed in relation to the phase of the incoming signal. Communication systems in accordance with some embodiments can take advantage of this phase insensitivity by adjusting the phase of transmitted aggressor data to minimize the impact of crosstalk on data on potential victim channels. Adjusting the phase, as used herein, means adjusting the timing of the clock signal that times the transmission of data, and consequently adjusting the timing of the transmitted data transitions relative to potential victim data.

Figure 2A:
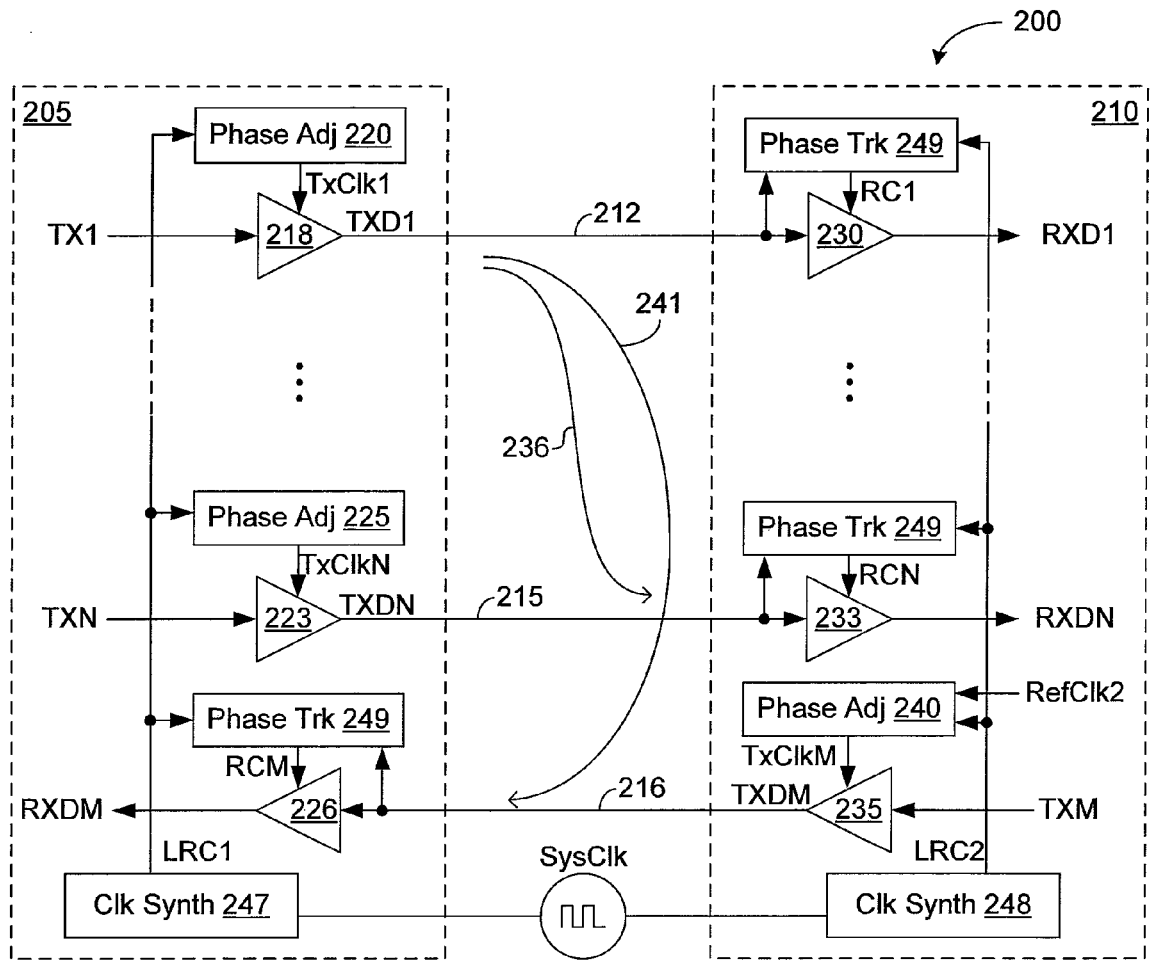
FIG. 2A depicts a mesochronous serial communication system 200 in accordance with one embodiment.

FIG. 2A depicts a mesochronous serial communication system 200 in accordance with one embodiment. System 200 includes an exemplary transceiver 205 (e.g. an integrated circuit on a line card) coupled to a second transceiver 210 via respective first, second, and third communication channels 212, 215, and 216. In some embodiments the links made up of channels 212, 215, and 216 and their respective transmitters and receivers are not contained in the two devices 205 & 210, but are in as few as one device or distributed across many different devices in a system. The system shown in FIG. 2 is meant to be exemplary and not exclusive. Transceiver 205 includes a first transmitter 218 that receives transmit data TX1 on a corresponding first data input terminal. Transmitter 218 synchronizes the transmit data TX1 to a first transmit clock TxClk1 and conveys the resulting re-timed serial data TXD1 to a receiver 230 in transceiver 210 via channel 212. A phase-adjust circuit 220 derives transmit clock TxClk1 from a local reference clock LRC1, which is in turn derived from a system clock SysClk by a conventional clock synthesizer 247. Transceiver 210 also includes a clock synthesizer 248, which derives a second local reference clock LRC2 from the same system clock SysClk as synthesizer 247. A phase tracking circuit 249 associated with receiver 230 derives a channel-specific receive clock RC1 from the incoming transmit data TXD1 on channel 212. The phase adjust and phase tracking circuits of FIG. 2A are simplified here for ease of illustration, but are described in more detail below in connection with FIG. 4.

Transceiver 205 includes N−1 additional transmitters, though only the Nth transmitter 223 is shown. Transmitter 223, with an associated phase-adjust circuit 225, drives a respective second transmit signal TXDN to a corresponding receiver 233 of transceiver 210 via channel 215. The last communication channel 216 transmits data TXDM in the reverse direction, from a transmitter 235 with associated phase-adjust circuit 240 to a receiver 226 and associated phase tracking circuit 249. In an alternative embodiment, communication system 200 may comprise only one of the two links made up of the 223/215/233 link and the 235/216/226 link. In other alternative embodiments, communication system 200 may comprise one or more links in each direction.

Transmitter 218 and receiver 230 perceive different phases of system clock SysClk due to different propagation delays between the system clock source and the separate transceivers. This phase error does not pose a problem, however, as the receivers do not use the system clock to capture data, but instead use the system clock as a frequency reference and use standard clock and data recovery "CDR" techniques to generate local receive clock LRC1. An example of conventional receive circuitry that extracts timing and data from serial data is described below in connection with FIG. 4.

The phase-adjust circuits associated with each transmitter alter the phase of the transmit clocks, and consequently the transmitted data, to reduce the impact of crosstalk. For illustrative purposes, channel 212 is assumed to be an aggressor channel that induces undesirable crosstalk into victim channels 215 and 216. Additional aggressor channels might also be included, and their separate or combined effects can exacerbate crosstalk problems. Additional aggressor channels are omitted here for ease of illustration.

System 200 addresses two distinct forms of crosstalk. The first, commonly referred to as "far-end crosstalk" (FEXT), is characterized by the crosstalk source being received at the same destination as the victim, and is illustrated by arrow 236. Signals switching on channel 212 cross-couple to channel 215 and are consequently perceived, at least in part, by receiver 233. The second form of crosstalk, commonly referred to as "near-end crosstalk" (NEXT), is characterized by the crosstalk source originating at the same location as the victim receiver, and is illustrated by an arrow 241. In that case, signals switching on channel 212 may cross-couple to channel 216 and may consequently be perceived, at least in part, by receiver 226.

Figures 2B, 2C:
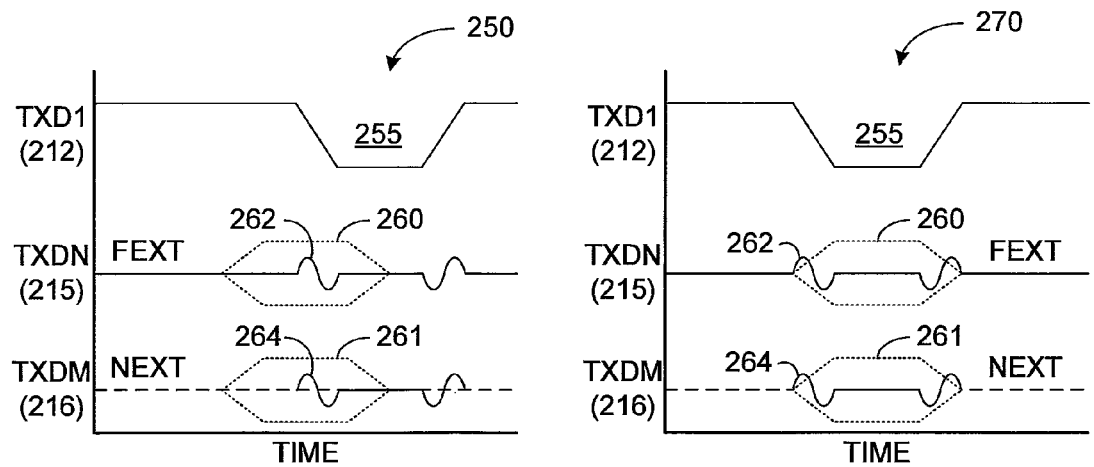
FIG. 2B is a simple waveform diagram 270 depicting eye patterns 255, 260, and 261 associated with respective transmit data TXD1, TXDN, and TXDM of respective channels 212, 215, and 216 of FIG. 2A.
FIG. 2C is a waveform diagram 250 depicting the effect, from the victim receiver's perspective, of misaligning aggressor data.

FIG. 2C is a simple waveform diagram 250 depicting an aggressor data symbol 255 associated with transmit data TXD1 of channel 212 and two eye diagrams 260 and 261 associated with respective transmit data TXDN and TXDM of respective channels 215 and 216. The transition times of the aggressor data, illustrated by the falling and rising edges of symbol 255, induce FEXT and NEXT artifacts 262 and 264 in nearby channels 215 and 216. If artifacts 262 and 264 are of sufficient amplitude and duration, victim receivers 226 and 233 will experience increased bit-error-rates. Artifacts 262 and 264 are particularly troublesome if they occur at the sample instants of the received victim data, typically at or near the center of eyes 260 and 261.

Returning to FIG. 2A, phase-adjust circuits 220 and 225 can alter the transmit timing of the aggressor data symbol 255 and victim data eye 260. Offsetting the timing of data transmitted on one or more aggressor channels with respect to data transmitted on one or more victim channels can reduce the impact of the aggressor data on the victim data. FIG. 2B is a waveform diagram 270 depicting this desirable effect. In this example, the timing of data symbol 255 is altered, as compared with the example of FIG. 2C, with respect to victim eye diagrams 260 and 261. Artifacts 262 and 264 are thus offset with respect to the sampling instants of the received victim data 260 and 264 to instants at which the victim channels are less sensitive to crosstalk. The detrimental impact of NEXT and FEXT is thus reduced or eliminated.

The appropriate phase offsets can be established once or periodically, at power-up for example. An overall system approach can identify victim links by monitoring receiver bit-error rates. In one embodiment, one or more victim links are identified by determining which links have relatively high bit error rates. Links physically located near the victim link are identified and referred to as "likely aggressor links." Likely aggressors can then be phase adjusted in the manner described above to minimize the bit-error rates of the victim receivers. Such an approach might focus on reducing the bit-error rate of the most noise-sensitive channels, or might attempt to minimize the bit-error rate for the entire system. Alternatively, collections of neighboring or related communication channels can be optimized in groups, as where the speed performance of a system depends heavily on a particular one or a subset of the communication channels. In another embodiment, a multi-variable optimization routine may be used to improve overall system performance. In one such embodiment, one or more victim links are identified by determining which links have relatively high bit error rates. The overall bit error rate of the system may also be determined. A number of likely aggressor links are identified, for example by physical proximity, and the timing of the data transmitted on these links is adjusted. The bit error rates of the individual victim channel, the overall system, or both are then recalculated. These steps are repeated until an optimal or acceptable per-channel or system-wide bit error rate is obtained.

Figure 3A:
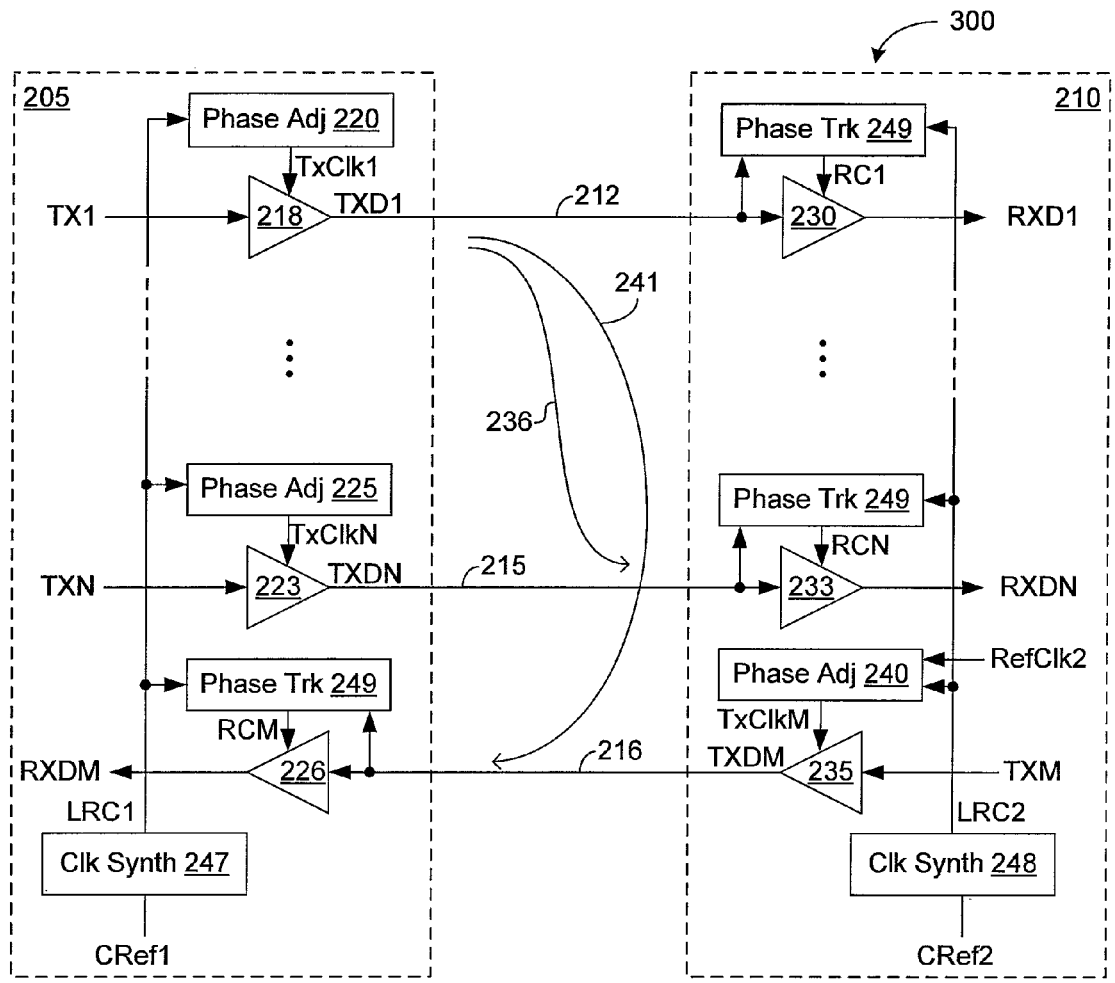
FIG. 3A depicts a plesiochronous system 300 in accordance with another embodiment.

FIG. 3A depicts a plesiochronous system 300 in accordance with another embodiment. System 300 is similar to system 200 of FIG. 2A, like-numbered elements being the same or similar. In a plesiochronous system, the communicating components do not share the same system clock. Each component may contain some clock-synthesis circuitry, which may include a phase-lock loop, to generate local clocks. In this example, clock synthesizers 247 and 248 develop respective local receive clocks LRC1 and LRC2 from respective local reference clocks CRef1 and CRef2. In FIG. 3A, as in FIG. 2A, and solely for illustrative purposes, channel 212 is depicted as the aggressor and channels 215 and 216 are depicted as the victims.

The techniques described above in connection with the mesochronous system 200 of FIG. 2A can be applied to plesiochronous systems. The clocks used by aggressor transmitters and victim receivers to time the transmission and reception of signals in plesiochronous systems are not fixed in phase relative to each other because of the frequency differences of their respective local clocks. Because fixed clock alignment is unavailable in such cases, the phase-adjustment techniques discussed above for mesochronous systems do not apply to NEXT in plesiochronous systems. Transmitters on the same device in a plesiochronous system do share a common clock, however, so the relative phases of transmitted signals can be adjusted as discussed above in plesiochronous systems to reduce the impact of FEXT.

The systems of FIGS. 2A and 3A provide fixed, optimized phase relationships between transmitted data streams to reduce the impact of FEXT and NEXT in mesochronous systems and to reduce the impact of FEXT in plesiochronous systems. Another embodiment, introduced below in connection with FIG. 3B, reduces the impact of FEXT and NEXT in both mesochronous and plesiochronous systems.

Figure 3B:
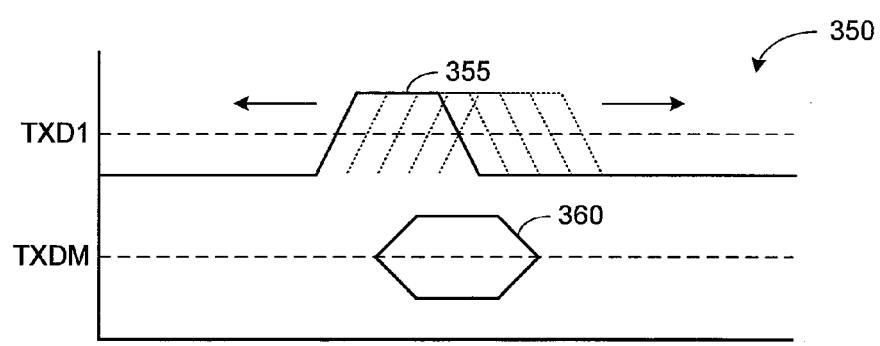
FIG. 3B is a waveform diagram 350 depicting the effect of sweeping a transmit data eye 355 for the transmit data TXD1 associated with aggressor channel 212.

FIG. 3B is a waveform diagram 350 depicting a transmit data symbol 355 for the transmit data TXD1 associated with aggressor channel 212 of FIG. 3A. Moving the timing of aggressor symbol 355 with respect to victim data eyes 360 of victim data on channel 216 reduces the likelihood that a given crosstalk artifact will be introduced coincident with the sampling instant on victim channel 216. Transmission errors that result from crosstalk may still occur on occasion, but such errors will tend to be spread out in time, as opposed to occurring in large numbers when system 300 encounters a particular phase relationship between local clock signals LRC1 and LRC2. This "phase walking" technique does not provide a fixed, optimized timing relationship, but instead reduces the probability of worst-case timing alignment, especially in a multi-aggressor environment by reducing the probability that multiple aggressor signals align in time to produce an additive deleterious effect on one or more victim channels.

Figure 4:
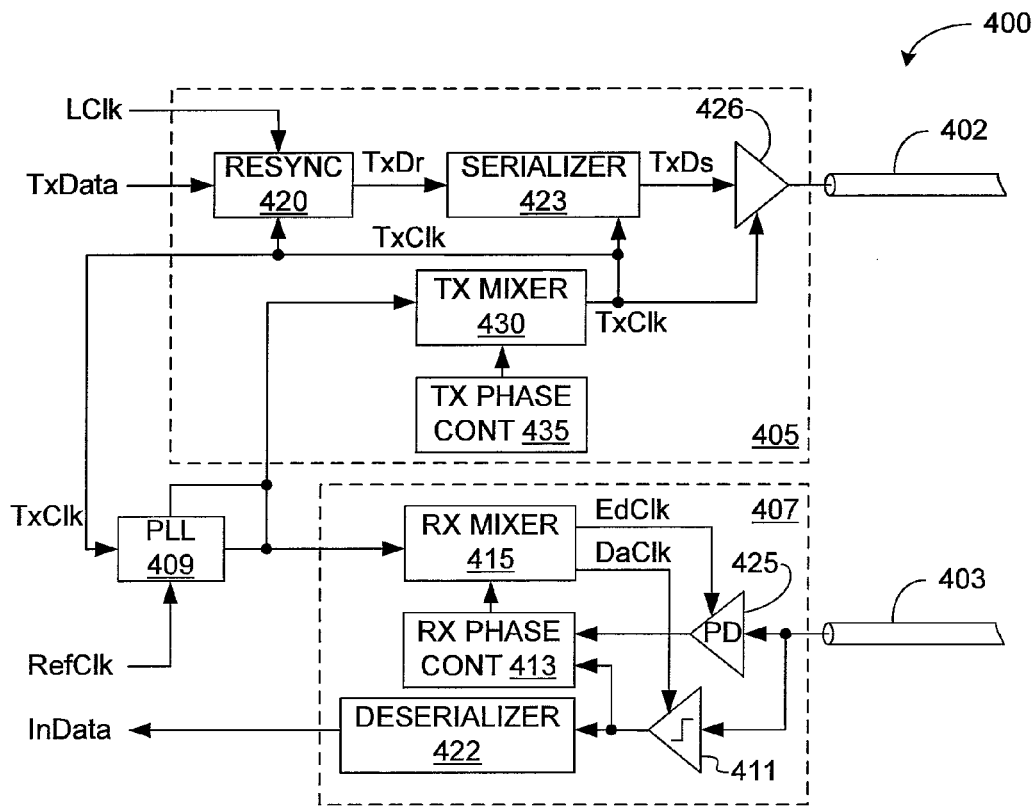
FIG. 4 depicts a transceiver 400 in accordance with an embodiment that can be used for mesochronous and plesiochronous systems.

FIG. 4 depicts a transceiver 400 in accordance with another embodiment. For simplicity, transceiver 400 includes only two communication channels, one outgoing channel 402 and one incoming channel 403, but typical systems may include more. Transceiver 400 includes a transmit section 405, a receive section 407, and a phase-lock loop (PLL) 409 shared by both transmit and receive sections 405 and 407.

Receive section 407 is of a well-known type, and is thus not described in detail. In brief, receive section 407 includes a phase detector 425 and a sampler 411, each of which samples received data from channel 403. Phase detector 425 provides an output signal to a receiver phase controller 413, which controls the sample timing of the received signal via a phase mixer 415 that derives edge and data clocks EdClk and DaClk by combining selected ones of a plurality of differently phased reference clocks from PLL 409. Sampler 411, thus properly timed, samples the incoming data and provides the resulting sampled data to a deserializer 422 for conversion to parallel input data InData.

Transmit section 405 is largely conventional, but is modified in accordance with one embodiment to allow for one-time, periodic, or continuous variation in the timing of the transmit clock TxClk. Transmit section 405 conventionally includes a resynchronizer 420 that re-times parallel transmit data TxData timed to a local clock LClk to transmit clock TxClk. The resulting re-timed parallel data TxDr is then fed to a serializer 423. Serial transmit data TxDs from serializer 423 is then conveyed to a transmitter 426 for transmission over channel 402. In one embodiment, resynchronizer 420 is of a type described in U.S. patent application Ser. No. 10/282,531, which issued on Sep. 27, 2005, as U.S. Pat. No. 6,949,958, which is incorporated herein by reference.

In addition to the foregoing conventional components, transmit section 405 includes a transmit phase mixer 430 controlled by transmit phase-control circuitry 435. Phase-control circuitry 435 may be a simple volatile or non-volatile register, in one embodiment, that can be loaded with different counts to adjust the phase of transmit clock TxClk. As discussed in connection with FIGS. 2A-2C, this count can be selected to minimize the impact of NEXT, FEXT, or both. In similar transmitters of other embodiments, phase controller 435 continuously or periodically alters the setting of phase mixer 430 to dynamically alter the timing of the transmitted signal or signals in the manner described in connection with FIG. 3B. In one embodiment, for example, phase controller 435 includes a counter that continuously counts up and down between two extremes of phase position to continuously sweep the phase of data eyes transmitted on channel 402 at a rate below that of the receive data CDR. Phase controller 435 and phase mixer 430 are analog devices in other embodiments, and thus allow for a full spectrum of dynamic or fixed phase adjustments.

Of interest, some conventional transceivers similar to the one of FIG. 4 include a transmit phase mixer between the PLL and transmit-clock line TxClk. One such system is shown, for example, in FIG. 14 of an article entitled "Equalization and Clock Recovery for a 2.5-10-Gb/s 2-PAM/4-PAM Backplane Transceiver Cell," by Jared L. Zerbe, et al. (IEEE JSSC, December 2003). The transmit phase mixer of that article is not adjustable, however, but is used only to match the delay of the transmit-clock path with the delay through the PLL feedback loop. Transmitters in accordance with the embodiments described herein add transmit phase-control circuitry to facilitate transmit phase adjustment.

Figure 5:
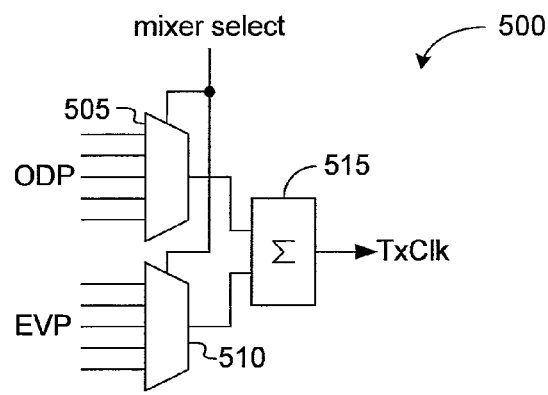
FIG. 5 (prior art) depicts a phase mixer 500 used in some embodiments of transceiver 400 as transmit phase mixer 430.

FIG. 5 (prior art) depicts a phase mixer 500 used in some embodiments of transceiver 400 as transmit phase mixer 430. Mixer 500 includes a first multiplexer 505, a second multiplexer 510, and an integrator 515. As is conventional, multiplexers 505 and 510 receive respective odd and even clock phases of a plurality of clocks derived from reference clock RefClk by PLL 409. Integrator 515 combines the selected odd and even phases to produce transmit clock TxClk. Similar mixers may be used for receive phase mixer 415.

Figure 6:
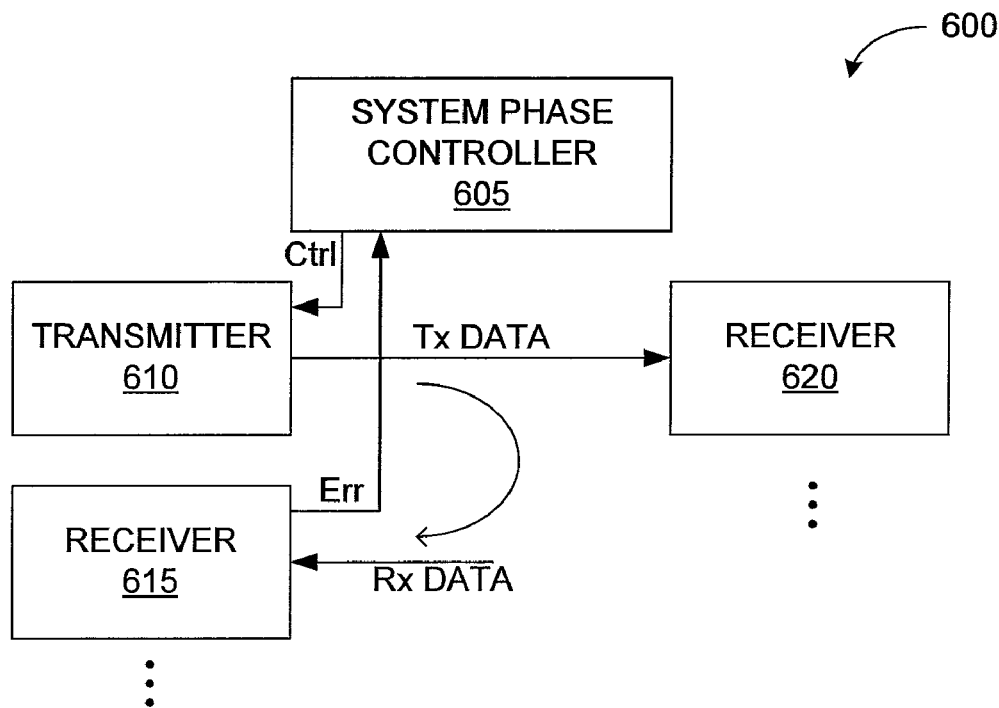
FIG. 6 depicts a communication system 600 in accordance with an embodiment in which a system phase controller 605 issues control signals Ctrl to a transmitter 610 based upon feedback signals received from one or more near-end receivers 615 and far-end receivers 620.

FIG. 6 depicts a communication system 600 in accordance with an embodiment in which a system phase controller 605 issues control signals Ctrl to a transmitter 610 based upon feedback signals received from one or more near-end receivers 615. Phase controller 605 can adjust the phase of data signals transmitted on one or more aggressor channels to minimize the impact of such data signals on victim channels. In the depicted example, system controller 605 controls the phase of data transmitted from transmitter 610 to a far-end receiver 620 to minimize the effects of NEXT on an adjacent victim data channel Rx DATA to receiver 615. Receiver 615 issues an error signal Err to controller 605, thus providing feedback upon which to base phase adjustments in transmitter 610. Error signal Err may carry a quality metric for the received data, such as a bit error rate, or the voltage margin, timing margin, or both to a particular bit error rate.

Figure 7:
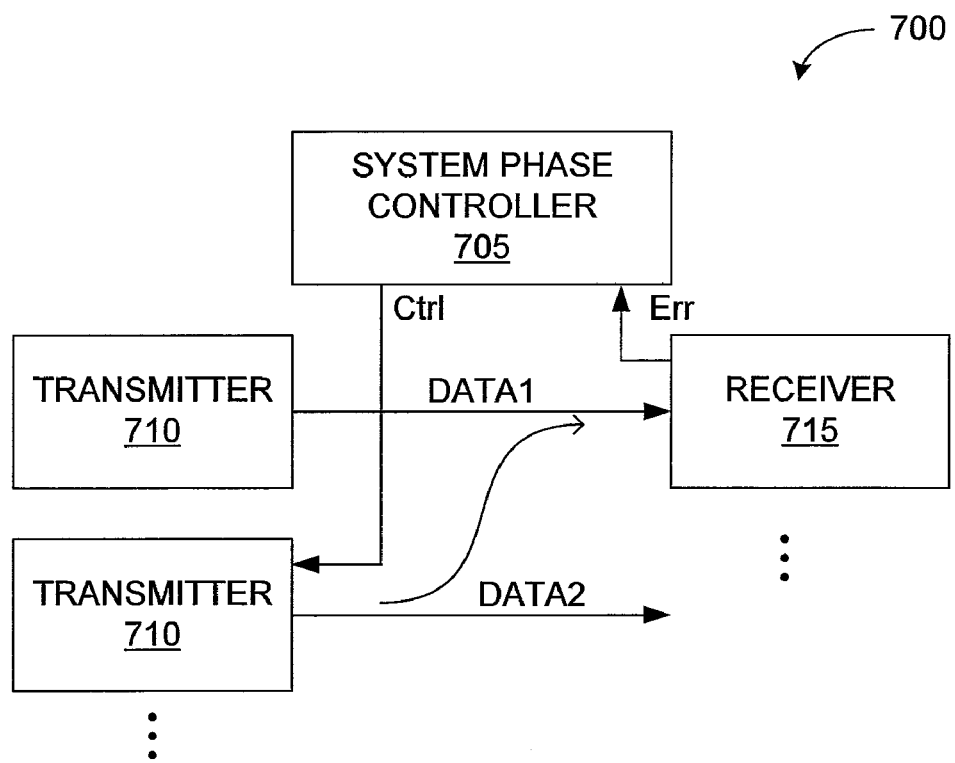
FIG. 7 depicts a communication system 700 in accordance with an embodiment in which a system phase controller 705 issues control signals Ctrl to one or more potential aggressor transmitters 710 in response to feedback signals received from one or more far-end receivers 715.

FIG. 7 depicts a communication system 700 in accordance with an embodiment in which a system phase controller 705 issues control signals Ctrl to one or more potential aggressor transmitters 710 in response to feedback signals received from one or more far-end receivers 715. Phase controller 705 adjusts the phase of data signals transmitted on aggressor channels to minimize the impact of such data signals on victim channels. In the depicted example, system controller 705 controls the phase of data Data2 to minimize the effects of FEXT on data Data1 to receiver 715. Receiver 715 issues error signals Err to controller 705, thus providing feedback upon which to base phase adjustments.

Figure 8:
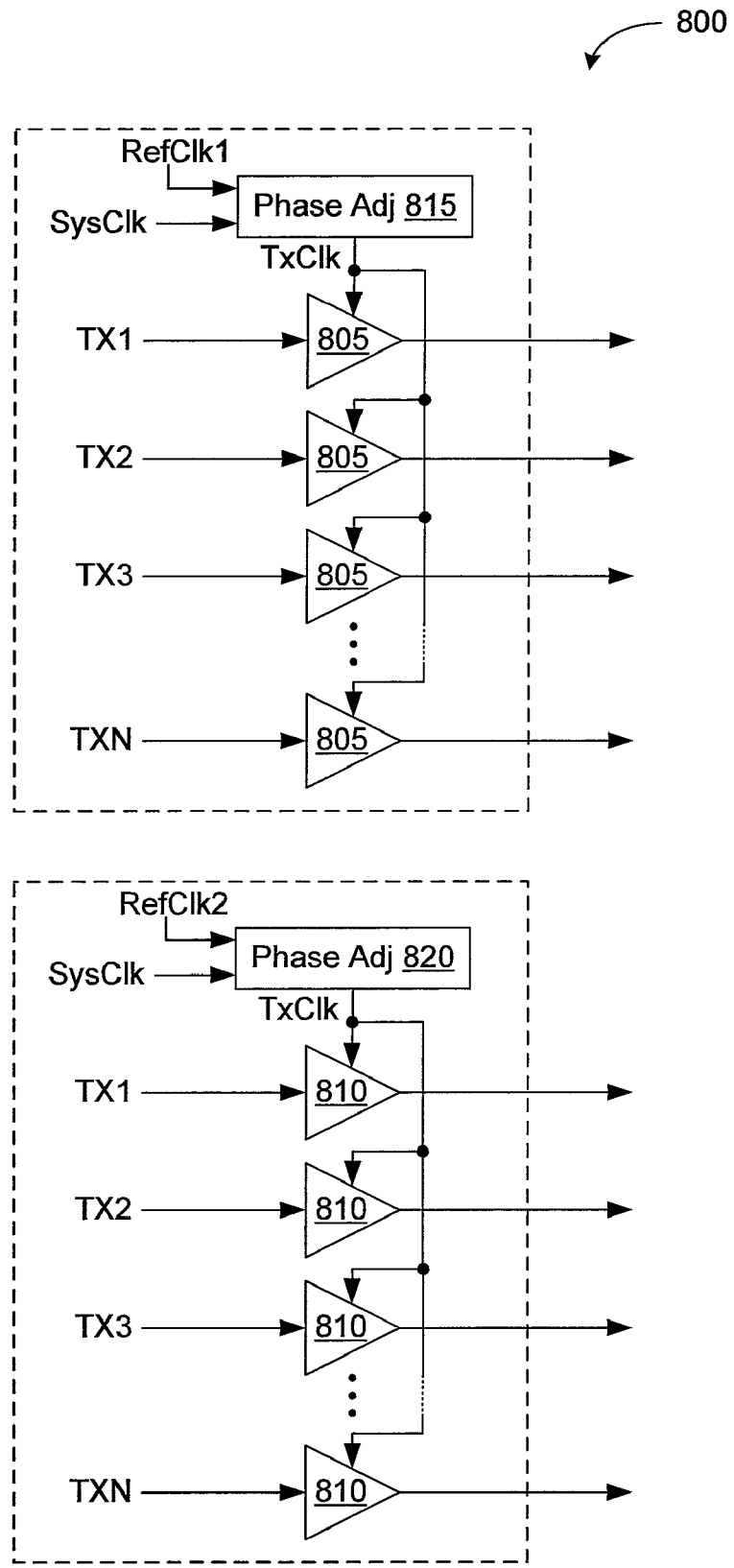
FIG. 8 depicts a multi-channel transmitter 800 that includes two (or more) collections of N transmitters 805 and 810.
Figure 9:
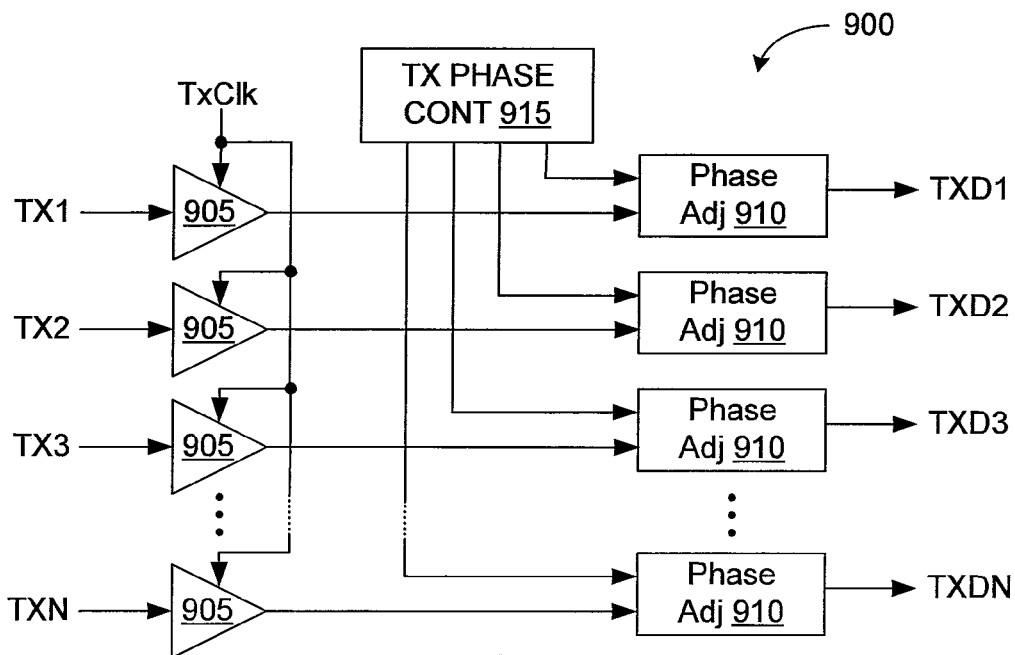
Figure 10:
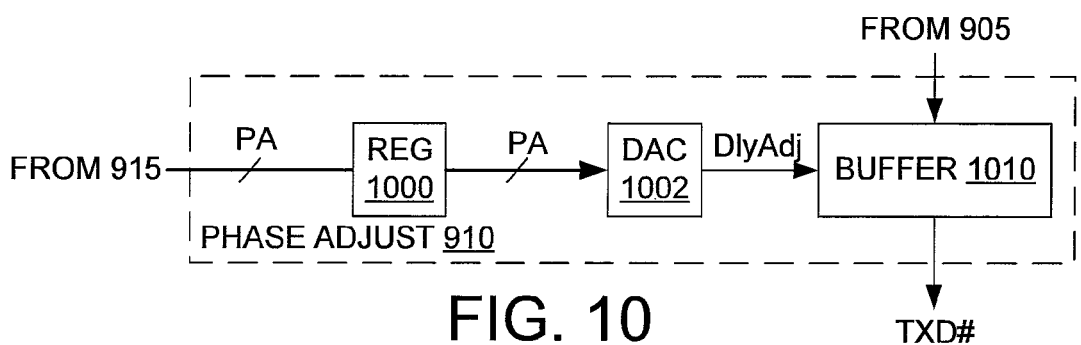
Figure 11:
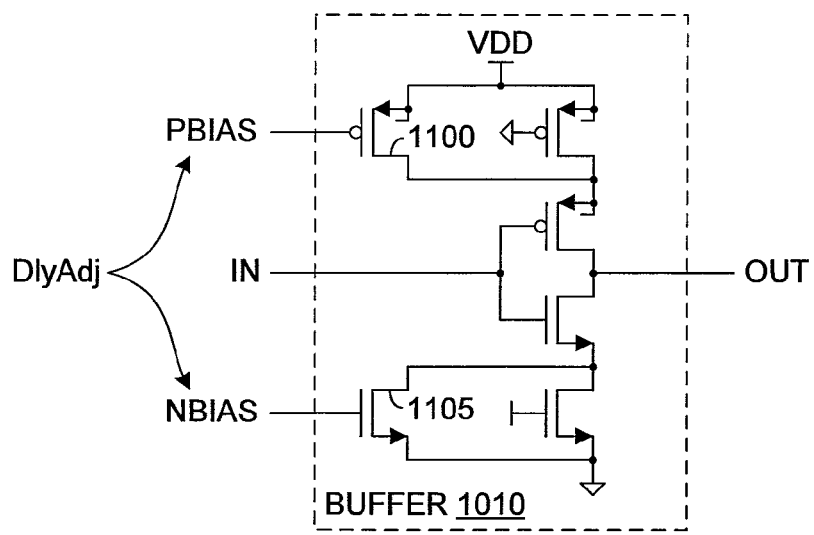

FIG. 8 depicts a multi-channel transmitter 800 that includes two (or more) collections of N transmitters 805 and 810. A first phase-adjust circuit 815 controls transmitters 805 and a second phase-adjust circuit 820 controls transmitters 810. The transmit channels from the separate collections are depicted as grouped together, but the physical channels may be overlapping, interleaved, etc. Transmitters 805 and 810 employ separate reference clocks RefClk1 and RefClk2, but may share a common clock. Further, transmitters 805 and 810 may be portions of the same or different integrated circuits and may be on the same or separate printed-circuit boards.

Figure 1:
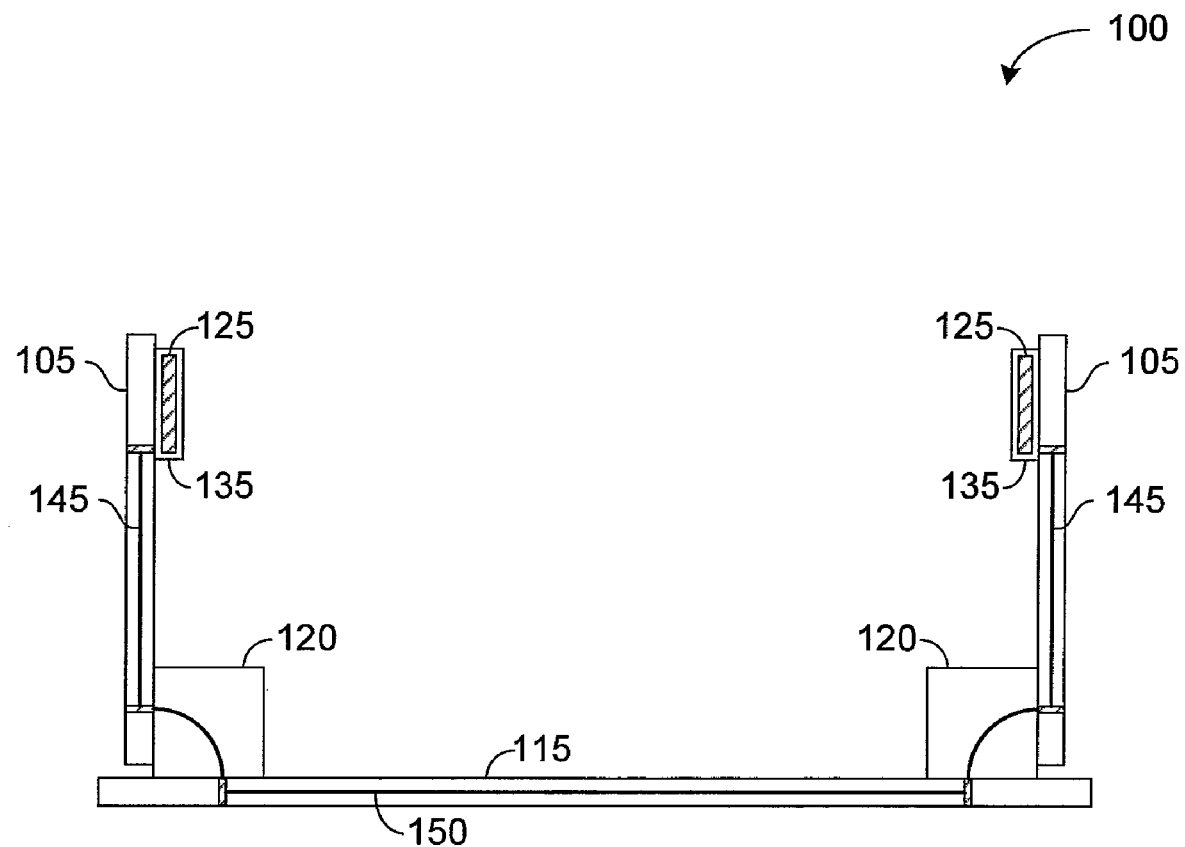
FIG. 1 (prior art) depicts a conventional backplane communication system 100.

As noted above in connection with FIG. 1, modem high-speed communication systems often include a complex matrix of densely populated communication channels. Some or all of the aggressor and victim transmitters may be provided with phase-adjustment circuits that can be optimized for a given noise environment. It may be sufficient, for example, to include phase adjustment for only a subset of potential aggressors and victims.

In the foregoing description and in the accompanying drawings, specific terminology and drawing symbols are set forth to provide a thorough understanding of the various depicted embodiments. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments.

While the present invention has been described in connection with specific embodiments, variations of these embodiments will be obvious to those of ordinary skill in the art. For example, while the foregoing embodiments reduce crosstalk in channels that extend between integrated circuits (ICs), the methods and circuits described herein can be adapted to reduce intra-IC crosstalk. Further, the timing of both the leading and trailing edges of transmitted data may be independently adjusted in some embodiments to reduce crosstalk effects. And, in still other embodiments, the crosstalk minimization schemes described herein are applied to asynchronous systems. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. A method of optimizing overall signaling performance of a collection of neighboring serial communication links, the method comprising:
    measuring a first quality metric of a respective data signal received at a corresponding receiver from each of the serial communication links to obtain first quality metrics;
    combining the first quality metrics to obtain a first combined quality metric;
    identifying a victim link from among the communication links using the first quality metrics;
    identifying at least one of the communication links physically near the victim link as a likely aggressor link;
    phase adjusting the data signal transmitted on the likely aggressor link relative to the data signal transmitted on the victim link;
    measuring a second quality metric of the data signal at each of the receivers;
    combining the second quality metrics to obtain a second combined quality metric; and
    comparing the first and second combined quality metrics to determine whether the phase adjustment to the data signal on the likely aggressor link relative to the data signal on the victim link improved the second combined quality metric relative to the first combined quality metric.

2. The method of claim 1, wherein the first and second quality metrics include at least one of bit-error rates, voltage margins, and timing margins.

3. The method of claim 1, further comprising repeating each element listed in claim 2 to identify likely victim links and likely aggressor links and phase adjusting the data signals on at least one of the likely aggressor links to achieve an acceptable per-link error rate in addition to an optimal combined quality metric.

4. The method of claim 1, further comprising repeating each element listed in claim 2 to identify likely victim links and likely aggressor links and phase adjusting the data signals on a plurality of the likely aggressor links to achieve an optimal combined quality metric.

5. The method of claim 1, wherein the likely aggressor link is one of a plurality of likely aggressor links, the method further comprising phase adjusting the data signals on each of the plurality of likely aggressor links to reduce the sum of the error rates.

6. A system for communicating parallel data signals, the system comprising:
    a first integrated circuit comprising:
        transmitters each configured to transmit a respective one of the data signals; and
        phase-adjustment circuits each configured to adjust the phase of the data signal transmitted by one of the transmitters relative to the data signals transmitted by others of the transmitters;
    a second integrated circuit comprising receivers each coupled to a corresponding one of the transmitters to receive the corresponding data signal as received data, and comprising clock-recovery circuitry to recover a receive clock signal from the received data, and a sampler to sample the received data on edges of the receive clock signal; and
    a system phase controller coupled to each of the receivers and to each of the phase-adjustment circuits, wherein the system phase controller monitors the sampled received data for receiver-specific quality metrics and causes the phase adjustment circuits to adjust the relative phases of the data signals to optimize a collective quality metric.

7. The system of claim 6, wherein the receiver-specific quality metrics include bit-error rates, and wherein the system phase controller adjusts the relative phases to minimize the sum of the bit-error rates.

8. The system of claim 6, wherein the system phase controller uses the quality metrics to identify victim communication links that extend between corresponding transmitters and receivers.

9. The system of claim 8, wherein the system phase controller identifies communication links physically near the victim communication links as likely aggressor channels.

10. The system of claim 9, wherein the system phase controller adjusts the phases of data signals transmitted on likely aggressor links more than the phases of data signals transmitted on others of the communication links to optimize the collective quality metric.

11. The system of claim 6, wherein the system phase controller is instantiated on at least one of the first and second integrated circuits.

12. A first integrated circuit for receiving data signals from a second integrated circuit, the first integrated circuit comprising:
   receivers each coupled to the second integrated circuit to receive a data signal, each receiver having clock-recovery circuitry to recover a receive clock signal from the received data signal and a sampler to sample the received data signal on edges of the receive clock signal;
   measurement circuitry to measure and issue a quality metric for each of the receivers; and
   phase-control circuitry coupled to the measurement circuitry, the phase-control circuitry to issue phase-control signals, responsive to the quality metrics, to the second integrated circuit instructing the second integrated circuit to adjust the phases of the data signals.

13. The system of claim 12, wherein the phase-control signals are to optimize a combined quality metric calculated from the quality metrics.

14. The system of claim 12, wherein the first integrated circuit uses the bit-error quality metrics to identify one or more communication links that extend from the second integrated circuit to respective ones of the receivers on the first integrated circuit as victim links.

15. The system of claim 14, wherein the first integrated circuit identifies one or more communication links physically near the victim links as likely aggressor links.

16. The system of claim 14, wherein the first integrated circuit issues the phase-control signals to adjust the phases of the data signals transmitted on likely aggressor links more than the phases of the data signals transmitted on others of the communication links to improve the quality metric for the receiver for the at least one victim link.

17. A first integrated circuit for transmitting data signals to corresponding receivers on a second integrated circuit, the first integrated circuit comprising:
   transmitters each configured to transmit one of the data signals synchronized with a transmit clock signal;
   phase-adjustment circuits each coupled to at least one of the transmitters and configured to adjust the phase of one of the data signals with respect to others of the data signals; and
   a system phase controller coupled to the phase adjustment circuits, the system phase controller to monitor sampled data from the receivers for quality metrics and to adjust the relative phases of the data signals to improve a combined metric calculated from the quality metrics.

18. The first integrated circuit of claim 17, wherein the system phase controller is to adjust the relative phases to optimize the combined metric.

19. The first integrated circuit of claim 17, wherein the system phase controller is to identify one or more communication links that extend between the first and second integrated circuits as victim links.

* * * * *